(12) United States Patent
Chang (10) Patent No.: US 7,956,953 B2
(45) Date of Patent: Jun. 7, 2011

(54) LIGHT GUIDE PLATE WITH SPIRAL-SHAPED LIGHT-GUIDING UNITS FOR USE IN A LIQUID CRYSTAL DISPLAY DEVICE

(75) Inventor: Tai-hao Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 707 days.

(21) Appl. No.: 12/107,475

(22) Filed: Apr. 22, 2008

(65) Prior Publication Data

US 2009/0147180 A1    Jun. 11, 2009

(30) Foreign Application Priority Data

Dec. 7, 2007    (TW) ............................... 96146815 A (51) Int. Cl.
*G02F 1/1335* (2006.01)

(52) U.S. Cl. ............................................ 349/62; 349/65

(58) Field of Classification Search ................ 349/61–65
See application file for complete search history.

(56) References Cited

U.S. PATENT DOCUMENTS

| | | | | |
|---|---|---|---|---|
| 6,074,069 A | * | 6/2000 | Chao-Ching et al. | ........... 362/26 |
| 7,322,733 B2 | * | 1/2008 | Chang et al. | ............ 362/617 |
| 2006/0034099 A1 | | 2/2006 | Yang et al. | |
| 2006/0239031 A1 | | 10/2006 | Lin et al. | |
| 2007/0223250 A1 | | 9/2007 | Chen et al. | |

FOREIGN PATENT DOCUMENTS

| | | |
|---|---|---|
| JP | 2002352614 A | 12/2002 |
| JP | 2004241323 A | 8/2004 |
| TW | 509605 | 11/2002 |
| TW | 276217 | 9/2005 |
| TW | I241441 | 10/2005 |
| TW | M291542 | 6/2006 |
| TW | I265355 | 11/2006 |
| TW | I266089 | 11/2006 |
| TW | I271490 | 1/2007 |
| TW | I274827 | 3/2007 |

* cited by examiner

*Primary Examiner* — Dung T. Nguyen
(74) *Attorney, Agent, or Firm* — Kirton & McConkie; Evan R. Witt (57) ABSTRACT

An optical plate includes a plurality of light-guiding elements. The optical plate includes a first optical surface which a light is incident to and a second optical surface which the light goes out from. The plurality of light-guiding elements disposed on the third optical surface are used for guiding the light incident to the first optical surface. Each light-guiding element includes a first arc portion, a second arc portion, and a third arc portion. Both first ends of the first arc portion and the second arc portion are connected with a first portion of the third arc portion, and a second end of the first arc portion is connected to a second portion of the second arc portion. Each light-guiding element is substantially spiral-shaped.

38 Claims, 10 Drawing Sheets

FIG. 5

LIGHT GUIDE PLATE WITH SPIRAL-SHAPED LIGHT-GUIDING UNITS FOR USE IN A LIQUID CRYSTAL DISPLAY DEVICE

BACKGROUND OF THE INVENTION

1. Field of the Invention

The present invention relates to a light guide plate for use in a liquid crystal display device, more particularly, a light guide plate having a plurality of spiral-shaped light-guiding elements.

2. Description of the Related Art

A backlight module is a key component of a liquid crystal display (LCD). The purpose of the backlight module is to provide a sufficient brightness and an even distributing light surface to the LCD panel. Because LCD is widely used in various electronic products such as monitors, notebook computers, digital cameras, and projectors, the demand for the backlight module has increased tremendously.

The backlight module comprises a light source (such as a cold cathode fluorescent lamp, a hot cathode fluorescent lamp, a light emitting diode), a light guide plate, a reflector disposed at a side of the light guide plate, a diffusion sheet, and prism sheets. The reflector is used for reflecting light from the light source toward the light guide plate. Then the light guide plate guides light emitted from the light source and light reflected from the reflector as uniform planar light. Through the light-distributing of the diffusion sheet and light-gathering of the prism sheets, the light is fed into an LCD panel. The prism sheets are formed by hardening an acrylic resin on a polyester film with a thickness of 125-μm by means of exposure under high energy UV light. The prism sheets are served as bar-alignment triangle prisms in characteristics of a vertex angle of substantial 90 degrees with an interval of 50 μm within each other. The prism sheets can concentrate scatter light from the light guide plate upward with substantial ±35 degrees with respect to a direction of an on-axis.

The conventional light guide plate comprises light-guiding elements regularly aligned, each of which may be line-shaped, curve-shaped, or dot-shaped. However, the procedure of manufacturing such light-guiding elements is complex, and the machine for manufacturing such light-guiding elements is expensive, as is difficult to cost down. Also, once the alignment of the light-guiding elements is highly matched in parallel to the liquid crystal cell array, morie phenomenon is induced due to light interference. Furthermore, conventional line-shaped and curve-shaped light-guiding elements reflect light vertically incident to upwards, but scatter light not vertically incident to, reducing light efficiency.

SUMMARY OF THE INVENTION

Accordingly, the present invention is directed to an optical plate for use in a liquid crystal display device. The optical plate, e.g. a light guide plate, comprises spiral-shaped light-guiding elements to substantially obviate the problems due to limitations and disadvantages of the prior art.

According to the present invention, a liquid crystal display device comprises a light source for generating light, an optical plate, and a liquid crystal display panel disposed over the optical plate. The optical plate comprises a first optical surface which light is incident to from the light source, a second optical surface which the light goes out from, and a plurality of light-guiding elements formed on the third optical surface opposite to the second optical surface. The light-guiding elements are used for guiding the light incident to the first optical surface, each light-guiding element comprising a first arc portion, a second arc portion, and a third arc portion, wherein both first ends of the first arc portion and the second arc portion are connected with a first portion of the third arc portion, and a second end of the first arc portion is connected to a second portion of the second arc portion; and According to the present invention, an optical plate with a first optical surface which light is incident to, a second optical surface which the light goes out from, and a plurality of light-guiding elements formed on the third optical surface for guiding the light incident to the first optical surface. Each light-guiding element comprises a first arc portion, a second arc portion having a first end and a second end, and a third arc portion having a first end and a second end. Both the first ends of the first arc portion and the second arc portion are connected with the first portion of the third arc portion, and the second end of the first arc portion is connected to the second portion of the second arc portion.

These and other objectives of the present invention will become apparent to those of ordinary skill in the art after reading the following detailed description of the preferred embodiments illustrated in the various figures and drawings.

DETAILED DESCRIPTION OF THE INVENTION

Figure 1:
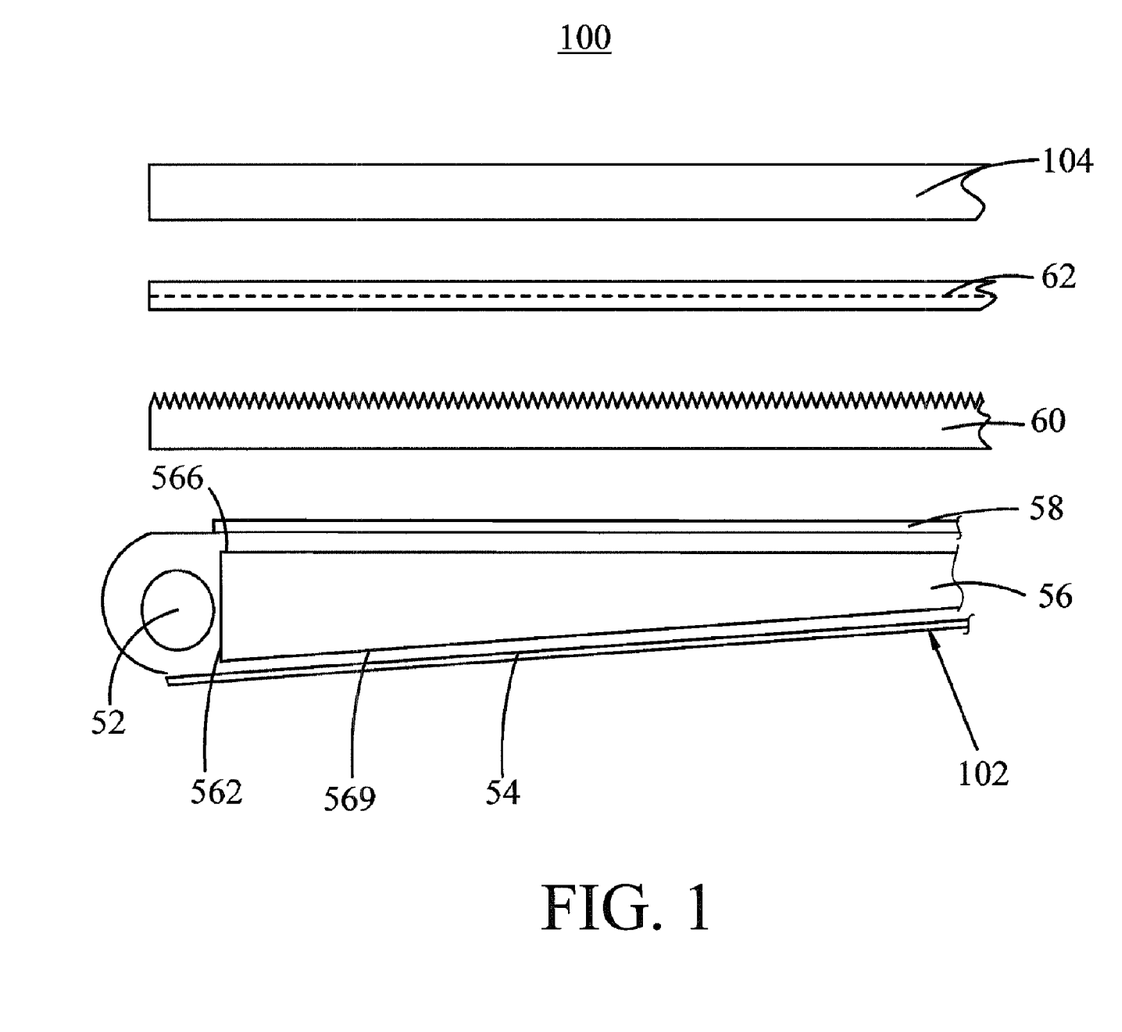
FIG. 1 show an element of a liquid crystal display device according to a preferred embodiment of the present invention.

Referring to FIG. 1 showing an element of a liquid crystal display device 100 according to a preferred embodiment of the present invention, the liquid crystal display device 100 comprises a backlight module 102 and a liquid crystal display panel (LCD panel) 104. The backlight module 102 comprises a light source 52 (such as a cold cathode fluorescent lamp, a hot cathode fluorescent lamp, a light emitting diode), a reflector 54, an optical plate (e.g. a light guide plate 56 in this embodiment), a diffusion sheet 58, and ridge prism sheets 60, 62. The reflector 54 is used for reflecting light from the light source 52 toward a third surface 569 of the light guide plate 56. The light guide plate 56 guides light emitted from the light source 52 and light from the third optical surface 569 and distributes the light as a uniform planar light source. Through the light-distributing of the diffusion sheet 58 and light-gathering of the prism sheets 60, 62, the light is fed into an LCD panel. Preferably, the prism sheets 60, 62 are served as bar-alignment triangle prisms. The prism sheets can concentrate scatter light from the light guide plate upward with substantial ±35 degrees with respect to a direction of an on-axis. The LCD panel 104 comprises liquid crystal molecule layer (not shown) for displaying an image based on an alignment of liquid crystal molecules and light from the light guide plate 56. The light guide plate 56 comprises a first optical surface 562 which light is incident to from the light source 52, and a second optical surface 564 which the light goes out from. A plurality of light-guiding elements 566 (not shown in FIG. 1) are disposed on the third optical surface 569. A total reflection phenomenon on the second optical surface 564 results in incident light reflecting toward the third optical surface 569. Then, the light is reflected toward the second optical surface 564 by the light-guiding elements 566 on the third optical surface 569, and refracted outward through the second optical surface 564.

It is appreciated that, in another embodiment, the plurality of light-guiding elements 566 may be disposed on the second optical surface 564 and/or the third optical surface 569.

Figure 2A:
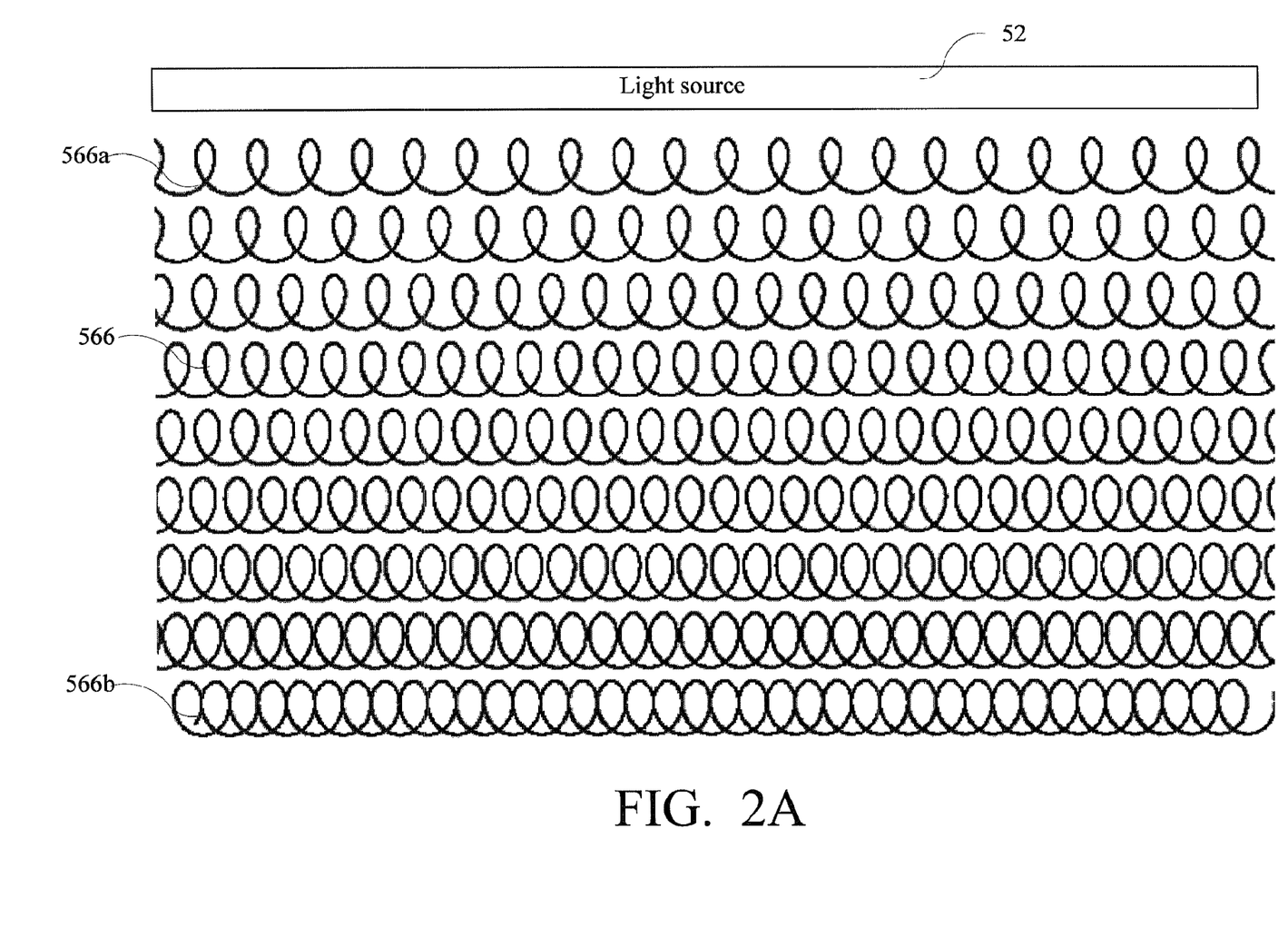
FIGS. 2A to 2E illustrate light-guiding elements in a sight toward third optical surface according to various embodiments of the present invention.
Figure 2B:
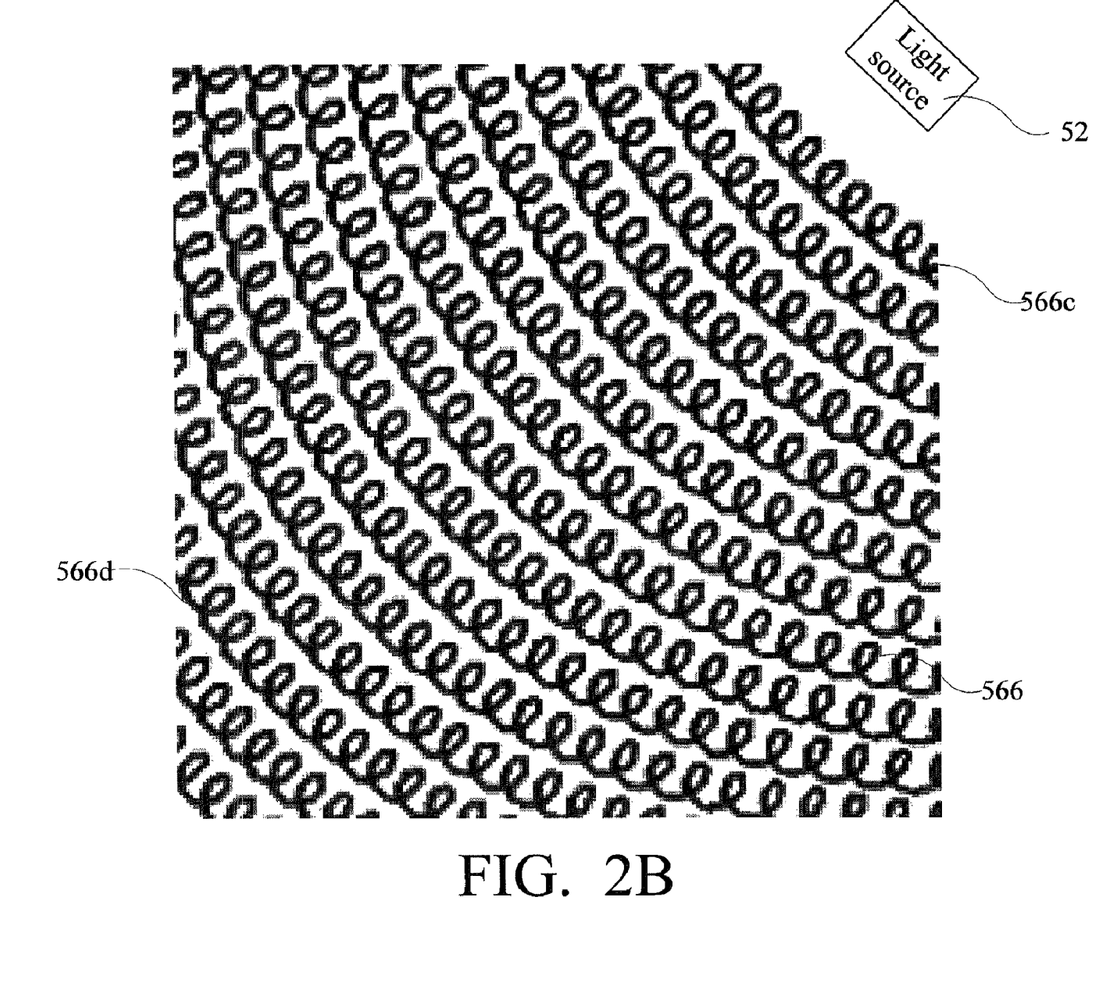
Figure 2C:
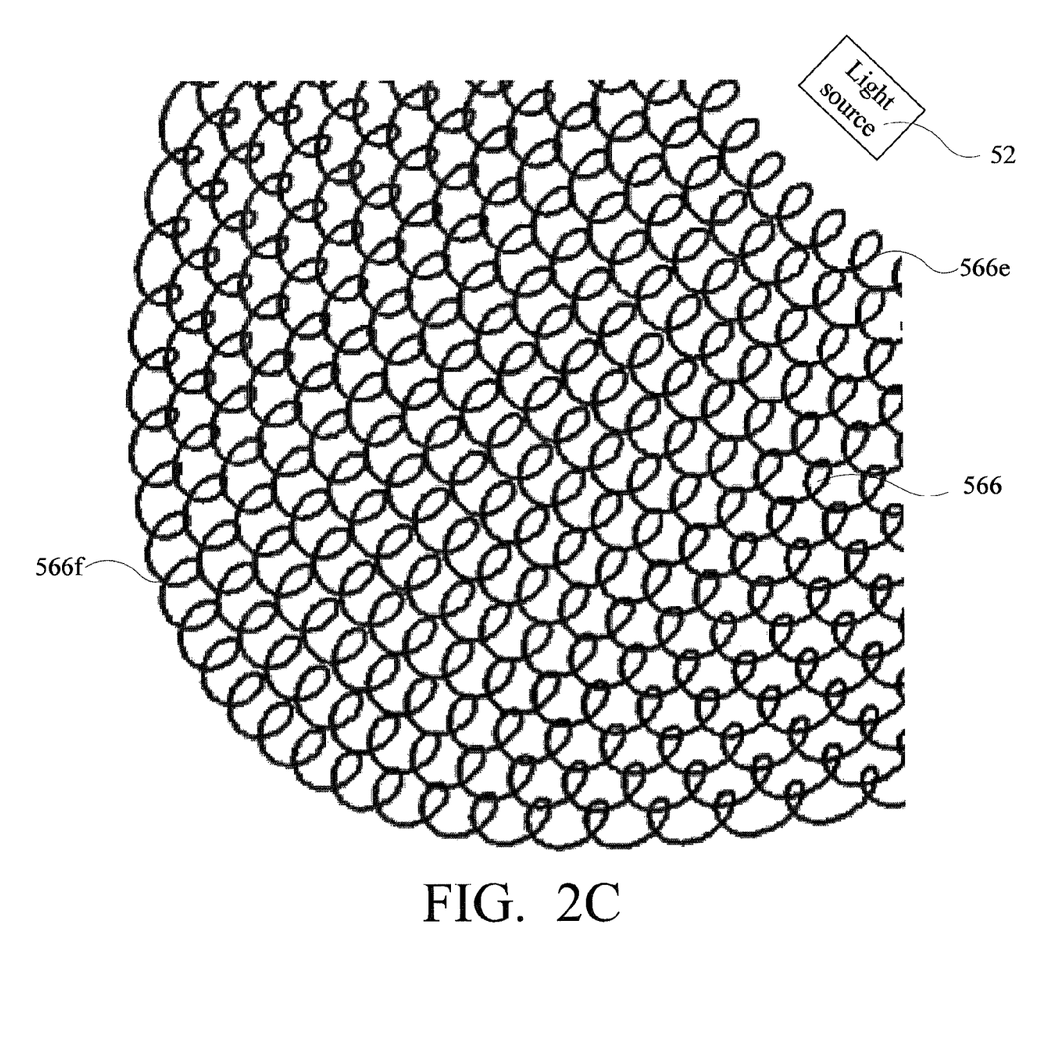
Figure 2D:
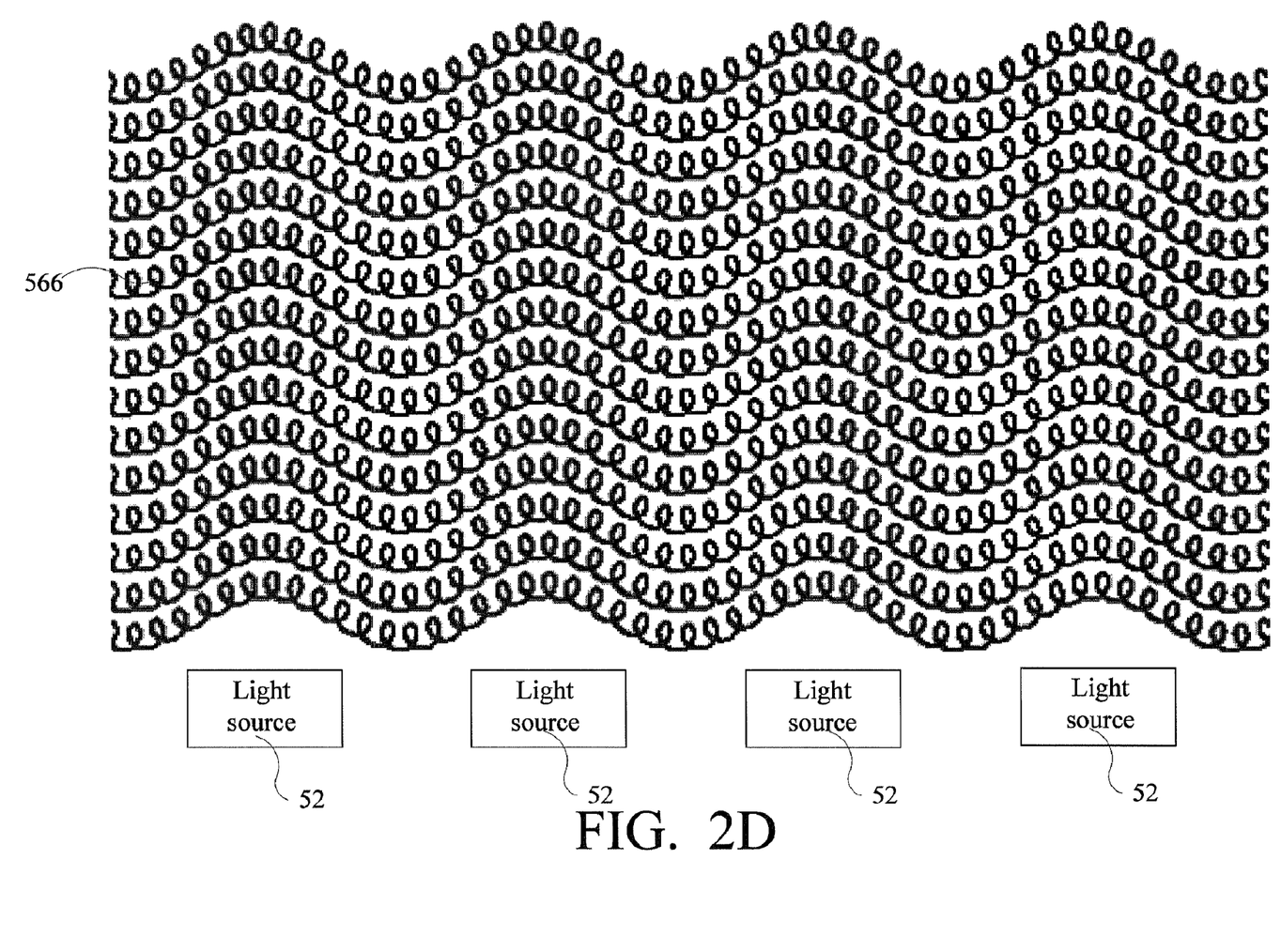
Figure 2E:
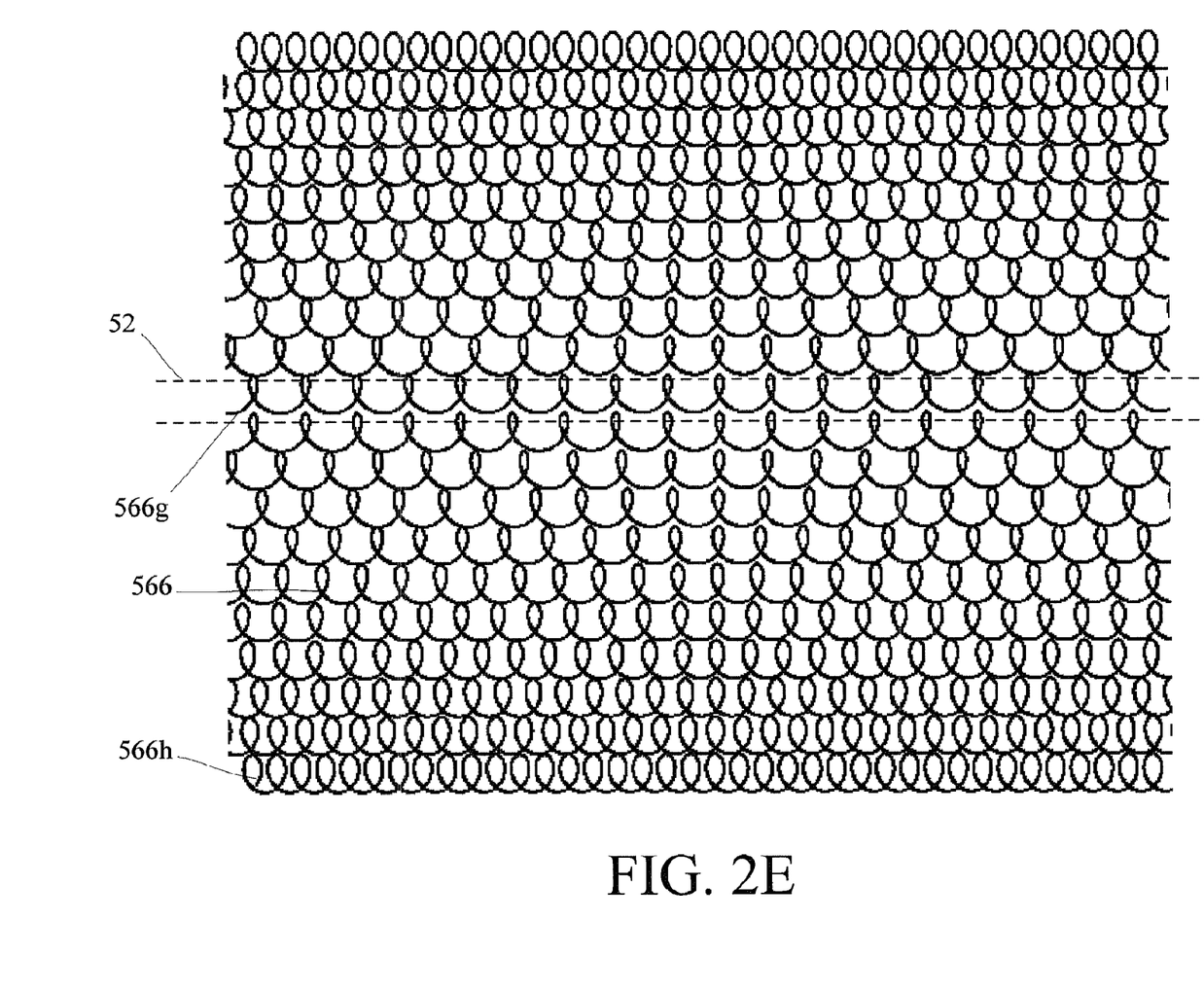
Figure 3:
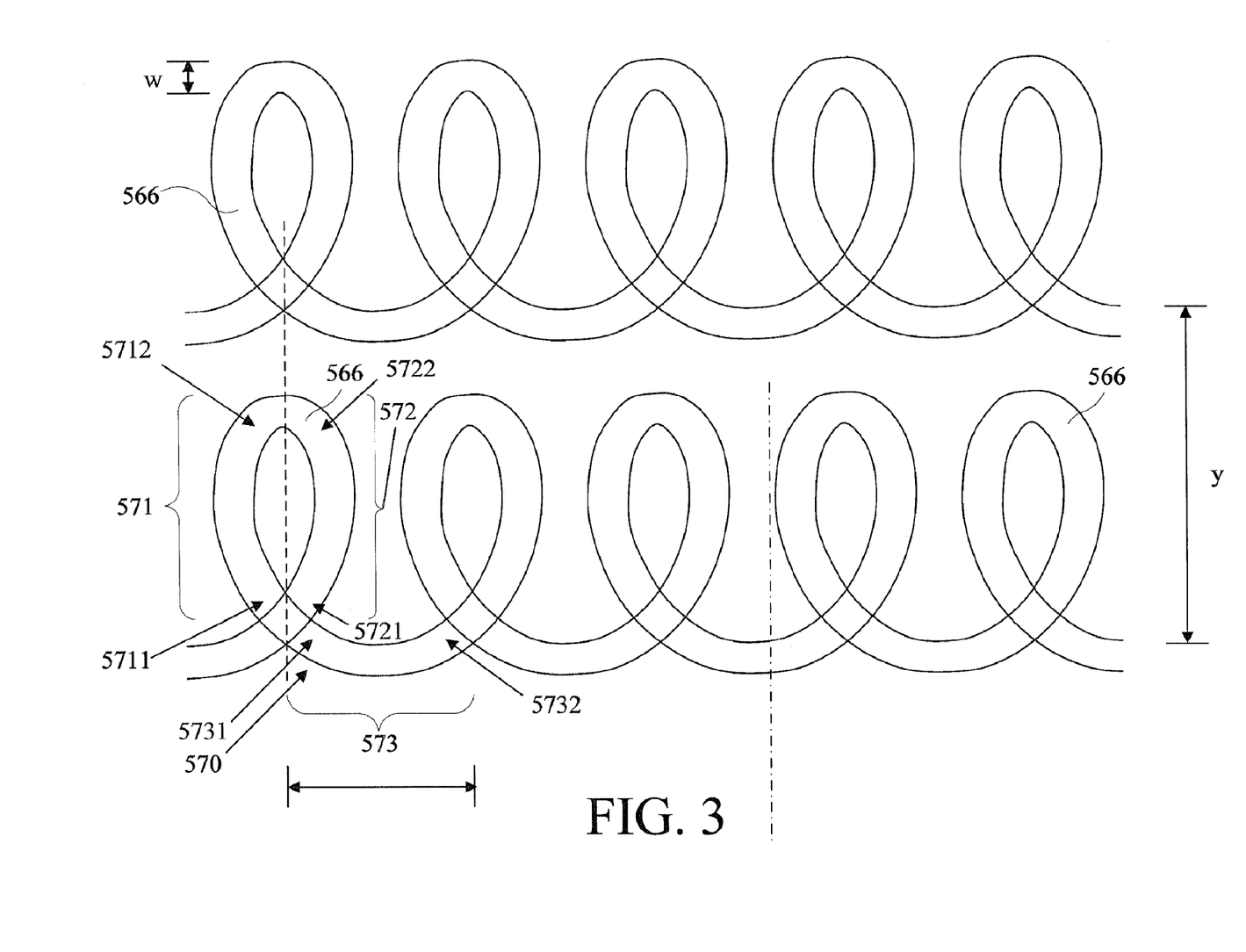
FIG. 3 shows an enlarged light-guiding element.

Through FIGS. 2A to 2E, each of which illustrates a light-guiding elements 566 in a sight toward the third optical surface 569 according to an embodiment of the present invention, and FIG. 3 showing an enlarged light-guiding element 566, in a sight toward the third optical surface 569, the plurality of light-guiding elements 566 are arranged in parallel, and are substantial spiral-shaped. Each light-guiding element 566 comprises a plurality of light-guiding elements 570, each of which comprises a first arc portion 571, a second arc portion 572, and a third arc portion 573. As shown in FIG. 3, a first end 5711 of the first arc portion 571 is connected with a first end 5721 of the second arc portion 572 and a first end 5371 of the third arc portion 573. A second end 5712 of the first arc portion 571 is connected to a second end 5722 of the second arc portion 572. The first arc portion 571 is symmetric with the second arc portion 572. A second end 5732 of each third arc portion 573 is connected to a first end 5731 of a third arc portion 573 of a neighbor light-guiding element 570. In other words, two neighbor light-guiding elements 570 may be but is not limit to connect to each other. As shown in FIG. 2A, a radian of the third arc portion 573 of the light-guiding element 566a which is closer to the light source 52 may be greater than that of the light-guiding element 566b which is farther from the light source 52. In other words, a pitch x of the light-guiding element 566a is greater than that of the light-guiding element 566b. As shown in FIG. 2B, each light-guiding element 566 is substantially aligned as a sector from the light source 52. A pitch x of each light-guiding element 566 in FIG. 2B may be adjusted as a change in distance away from the light source 52. For instance, a radian of the third arc portion 573 of the light-guiding element 566c which is closer to the light source 52 may be greater than that of the light-guiding element 566d which is farther from the light source 52. As shown in FIG. 2C, a third arc portion 573 of a light-guiding element 566e crosses to a first arc portion and a second arc portion of the light-guiding element 566f. As shown in FIG. 2D, each light-guiding element 566 is substantially wave-shaped and aligned in parallel with others. As shown in FIG. 2E, different from side-lighting backlight module used in LCD devices in FIGS. 2A to 2D, the light source 52 is positioned under the light guide plate 56 (i.e. bottom-lighting backlight module used in an LCD device). A radian of the third arc portion 573 of the light-guiding element 566g which is closer to the light source 52 may be greater than that of the light-guiding element 566h which is farther from the light source 52. In other words, a pitch x of the light-guiding element 566g is greater than that of the light-guiding element 566h. Besides the pitch x in the aforementioned embodiments, a pitch y between two neighbor light-guiding elements and a length w of the first arc portion (or the second arc portion) may be changed depending on design requirement. In a preferred embodiment, the pitch x is in a range between 0.05 mm and 1.00 mm, the pitch y is in a range between 0.10 mm and 1.00 mm, and the length w is in a range between 0.05 mm and 1.00 mm.

Figure 4A:
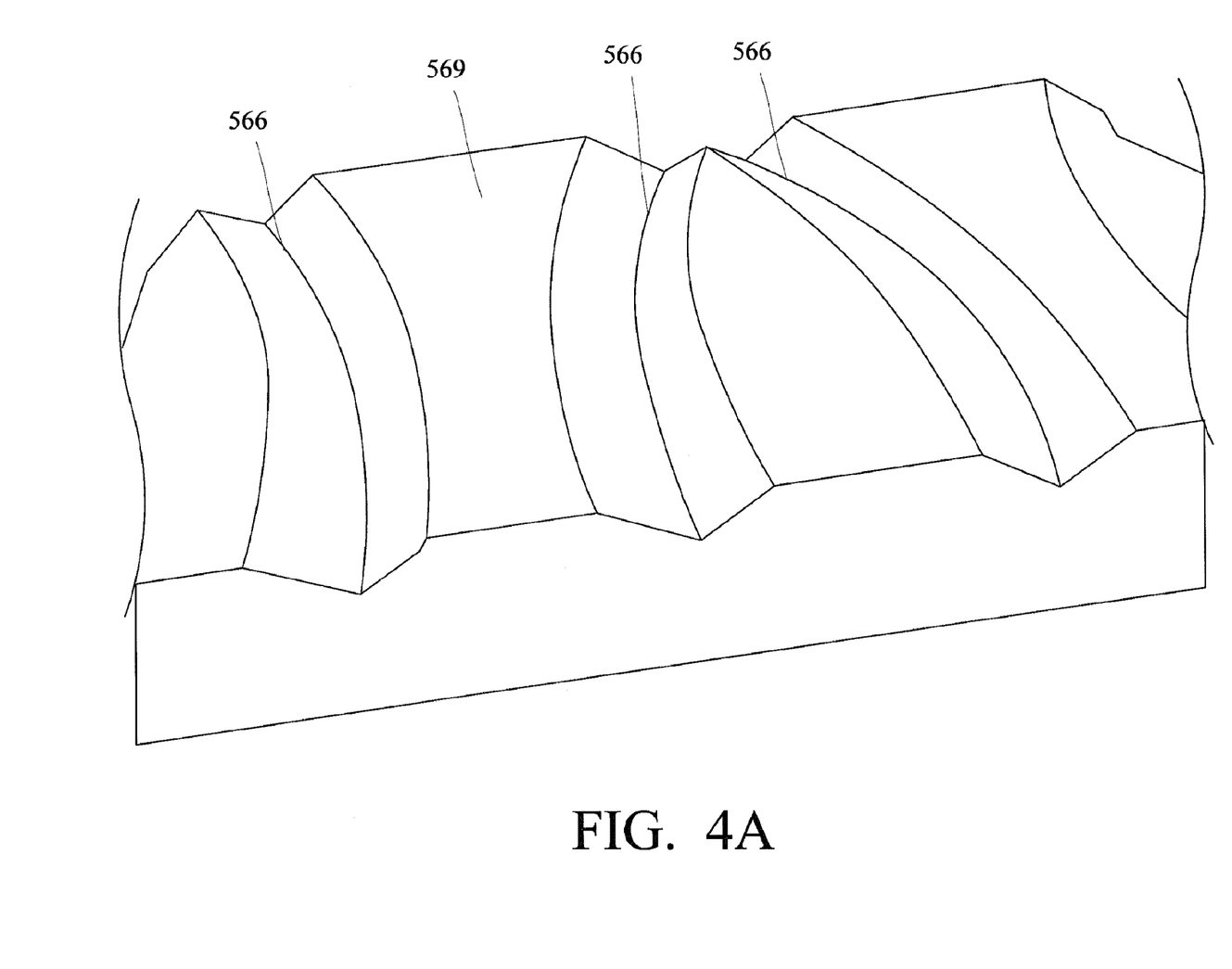
FIG. 4A to FIG. 4D show enlarged light-guiding elements according to various embodiments of the present invention.
Figure 4B:
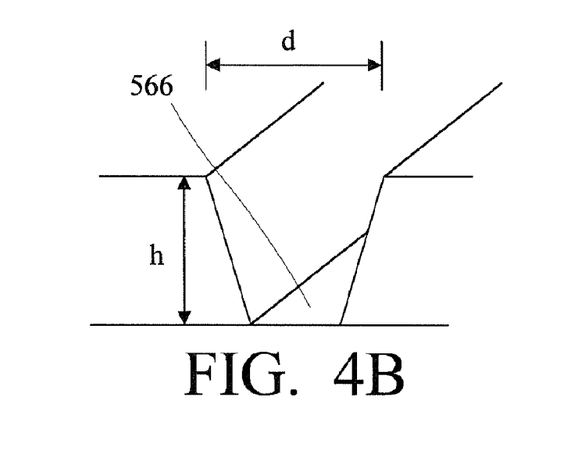
Figure 4C:
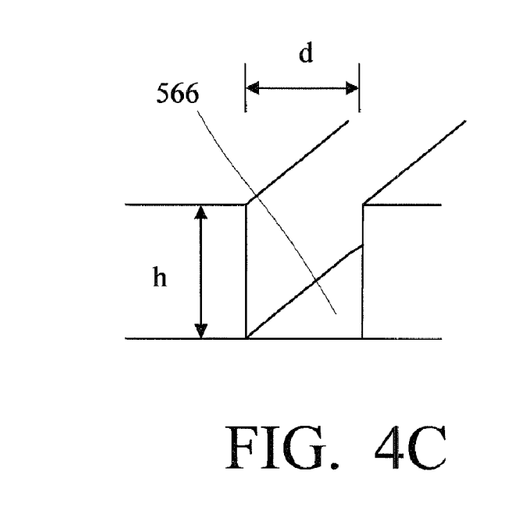
Figure 4D:
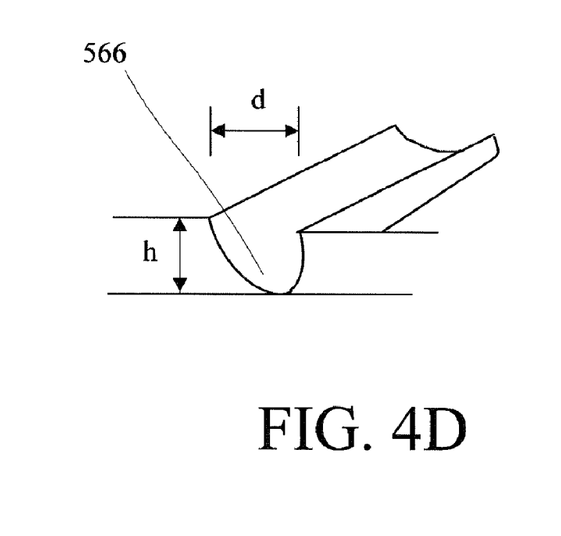

Referring to FIG. 4A to FIG. 4D, each of which shows an enlarged light-guiding element according to various embodiments of the present invention, a light-guiding element 566 depicted in FIG. 4A is a ditch with a section view shaped as a triangle. In this embodiment, a depth of the ditch is in a range between 0.0001 mm and 1 mm, an angle of the section of the ditch is in a range between 10 and 170 degrees, and a width of the ditch is in a range between 0.0001 mm and 1 mm. As shown in FIG. 4B through FIG. 4D, the section of the ditch may be shaped as a rectangle, a trapezoid or a half-circle. A depth h of the ditch is in a range between 0.0001 mm and 11 mm, and a width d of the ditch is in a range between 0.0001 mm and 1 mm.

Figure 5:
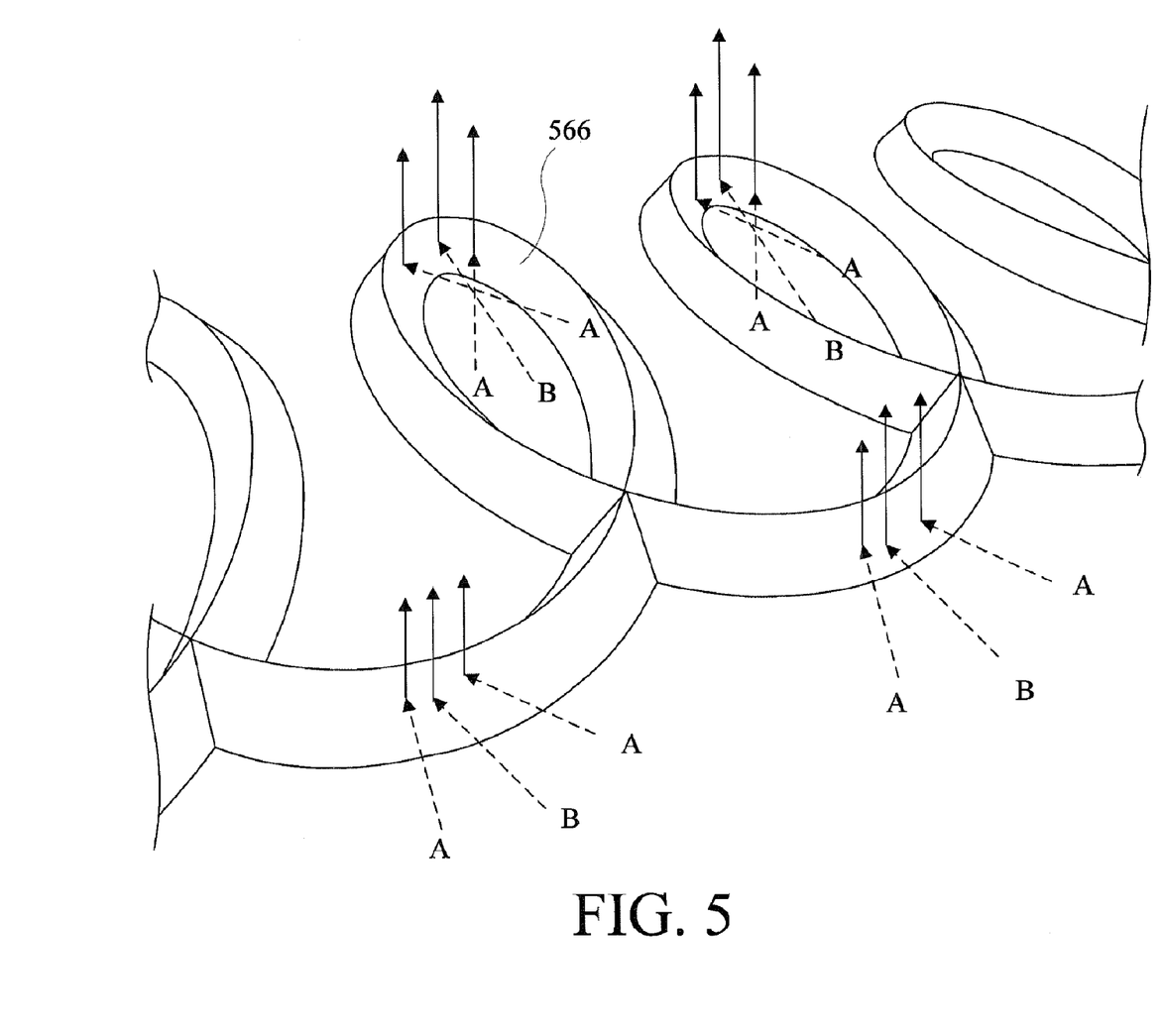
FIG. 5 shows an enlarged light-guiding element according to another embodiment of present invention.

With reference to FIG. 5 showing an enlarged light-guiding element according to another embodiment of present invention, the light-guiding element 566 is a protrusion out of the third optical surface 569. In this embodiment, a section view of the protrusion is shaped as a triangle. A height of the protrusion is in a range between 0.0001 mm and 1 mm, an angle of the section of the protrusion is in a range between 10 and 170 degrees, and a width of the protrusion is in a range between 0.0001 mm and 1 mm. Additionally, the section of the protrusion may be shaped as a rectangle, a trapezoid or a half-circle. A height of the protrusion is in a range between 0.0001 mm and 1 mm, and a width d of the protrusion is in a range between 0.0001 mm and 1 mm.

In addition to the light guide plate, the light-guiding element can be formed on a diffusion sheet 58 or any other optical plate for guiding light for use in a LCD device.

In contrast to prior art, the spiral-shaped light-guiding element 566 can reflect light vertically incident to (as arrow B shown in FIG. 5) as well as light not vertically incident to (as arrow A shown in FIG. 5) upwards. Additionally, a curve surface of the spiral-shaped light-guiding element 566 can collect light. Also, an approach to the present inventive light-guiding element of the optical plate is realized by chiseling a stamper to shape spiral ditches with a machine center and filling resin on the chiseled stamper to form the optical plate.

The present invention has been described with reference to certain preferred and alternative embodiments which are intended to be exemplary only and not limited to the full scope of the present invention as set forth in the appended claims. Accordingly, the scope of the invention shall be determined only by the appended claims and their equivalents.

What is claimed is:

1. A liquid crystal display device comprising:
   a light source for generating light;
   an optical plate comprising a first optical surface which light is incident to from the light source, a second optical surface which the light goes out from, a third optical surface opposite to the second optical surface, and a plurality of light-guiding elements for guiding the light incident to the first optical surface, each light-guiding element comprising a first arc portion, a second arc portion, and a third arc portion, wherein both first ends of the first arc portion and the second arc portion are connected with a first portion of the third arc portion, and a second end of the first arc portion is connected to a second portion of the second arc portion; and
   a liquid crystal display panel disposed over the optical plate.

2. The liquid crystal display device of claim 1, wherein the plurality of light-guiding elements are formed on the third optical surface.

3. The liquid crystal display device of claim 1, wherein plurality of light-guiding elements are formed on the second optical surface.

4. The liquid crystal display device of claim 1, wherein each light-guiding element is a ditch.

5. The liquid crystal display device of claim 4, wherein a section of the ditch is shaped as a triangle.

6. The liquid crystal display device of claim 5, wherein a depth of the ditch is in a range between 0.0001 mm and 1 mm, an angle of the section of the ditch is in a range between 10 and 170 degrees, and a width of the ditch is in a range between 0.0001 mm and 1 mm.

7. The liquid crystal display device of claim 4, wherein a section of the ditch is shaped as a rectangle, a trapezoid or a half-circle.

8. The liquid crystal display device of claim 7, wherein a depth of the ditch is in a range between 0.0001 mm and 1 mm, and a width of the ditch is in a range between 0.0001 mm and 1 mm.

9. The liquid crystal display device of claim 1, wherein each light-guiding element is a protrusion out of the second optical surface.

10. The liquid crystal display device of claim 9, wherein a section of the protrusion is shaped as a triangle.

11. The liquid crystal display device of claim 10, wherein a height of the protrusion is in a range between 0.0001 mm and 1 mm, an angle of the section of the protrusion is in a range between 10 and 170 degrees, and a width of the protrusion is in a range between 0.0001 mm and 1 mm.

12. The liquid crystal display device of claim 9, wherein a section of the protrusion is shaped as a rectangle, a trapezoid or a half-circle.

13. The liquid crystal display device of claim 12, wherein a depth of the protrusion is in a range between 0.0001 mm and 1 mm, and a width of the protrusion is in a range between 0.0001 mm and 1 mm.

14. The liquid crystal display device of claim 1, wherein the first arc portion is symmetric with the second arc portion.

15. The liquid crystal display device of claim 1, wherein the plurality of light-guiding elements are aligned in parallel.

16. The liquid crystal display device of claim 1, wherein the plurality of light-guiding elements comprises a first light guiding element and a second light-guiding element farther from the light source than the first light-guiding element, a radian of a third arc portion of the first light-guiding element is greater than a radian of a third arc portion of the second light-guiding element.

17. The liquid crystal display device of claim 1, wherein a second end of the third arc portion of each light-guiding element is connected to a first end of a third arc portion of a neighbor light-guiding element.

18. The liquid crystal display device of claim 1, wherein the optical plate is a light guide plate.

19. The liquid crystal display device of claim 1, wherein the optical plate is a diffusion sheet.

20. An optical plate with a first optical surface which light is incident to, a second optical surface which the light goes out from, and a third optical surface opposite to the second optical surface, comprising:
    a plurality of light-guiding elements formed on the third optical surface for guiding the light incident to the first optical surface, each light-guiding element comprising:
        a first arc portion comprising a first end and a second end;
        a second arc portion comprising a first end and a second end; and
        a third arc portion comprising a first end and a second end,
        wherein both the first ends of the first arc portion and the second arc portion are connected with the first portion of the third arc portion, and the second end of the first arc portion is connected to the second portion of the second arc portion.

21. The optical plate of claim 20, wherein the plurality of light-guiding elements formed on the third optical surface.

22. The optical plate of claim 20, wherein plurality of light-guiding elements formed on the second optical surface.

23. The optical plate of claim 20, wherein each light-guiding element is a ditch.

24. The optical plate of claim 23, wherein a section of the ditch is shaped as a triangle.

25. The optical plate of claim 24, wherein a depth of the ditch is in a range between 0.0001 mm and 1 mm, an angle of the section of the ditch is in a range between 10 and 170 degrees, and a width of the ditch is in a range between 0.0001 mm and 1 mm.

26. The optical plate of claim 24, wherein each light-guiding element is a protrusion out of the third optical surface.

27. The optical plate of claim 26, wherein a section of the protrusion is shaped as a triangle.

28. The optical plate of claim 27, wherein a height of the protrusion is in a range between 0.0001 mm and 1 mm, an angle of the section of the protrusion is in a range between 10 and 170 degrees, and a width of the protrusion is in a range between 0.0001 mm and 1 mm.

29. The optical plate of claim 26, wherein a section of the protrusion is shaped as a rectangle, a trapezoid or a half-circle.

30. The optical plate of claim 29, wherein a depth of the protrusion is in a range between 0.0001 mm and 1 mm, and a width of the protrusion is in a range between 0.0001 mm and 1 mm.

31. The optical plate of claim 23, wherein a section of the ditch is shaped as a rectangle, a trapezoid or a half-circle.

32. The optical plate of claim 31, wherein a depth of the ditch is in a range between 0.0001 mm and 1 mm, and a width of the ditch is in a range between 0.0001 mm and 1 mm.

33. The optical plate of claim 20, wherein the first arc portion is symmetric with the second arc portion.

34. The optical plate of claim 20, wherein the plurality of light-guiding elements are aligned in parallel.

35. The optical plate of claim 20, wherein the plurality of light-guiding elements comprises a first light guiding element and a second light-guiding element farther from the light source than the first light-guiding element, a radian of a third arc portion of the first light-guiding element is greater than a radian of a third arc portion of the second light-guiding element.

36. The optical plate of claim 20, wherein a second end of the third arc portion of each light-guiding element is connected to a first end of a third arc portion of a neighbor light-guiding element.

37. The optical plate of claim 20 being a light guide plate.

38. The optical plate of claim 20 being a diffusion sheet.

* * * * *